Feb. 24, 1925.
C. A. NERACHER
1,527,905
MOTOR CYCLE FRONT WHEEL ASSEMBLY
Original Filed June 27, 1921   4 Sheets-Sheet 1
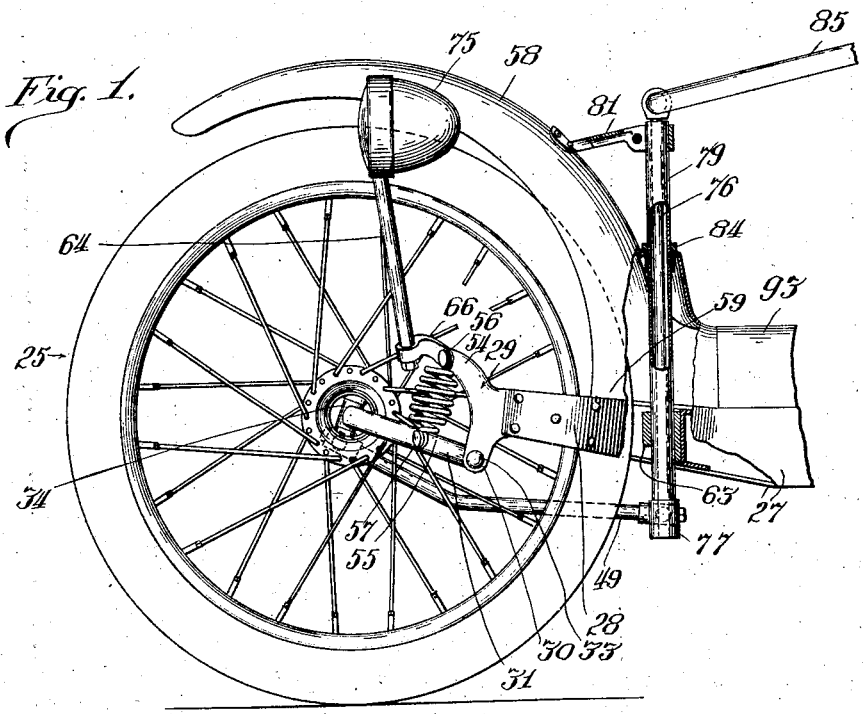
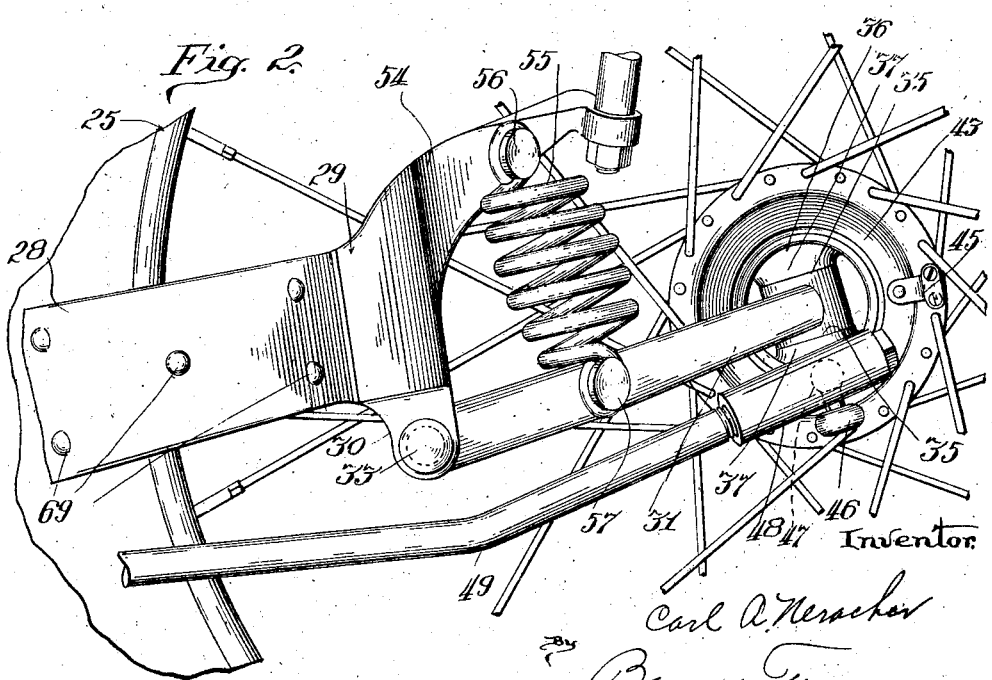

Feb. 24, 1925.
C. A. NERACHER
1,527,905
MOTOR CYCLE FRONT WHEEL ASSEMBLY
Original Filed June 27, 1921    4 Sheets-Sheet 2
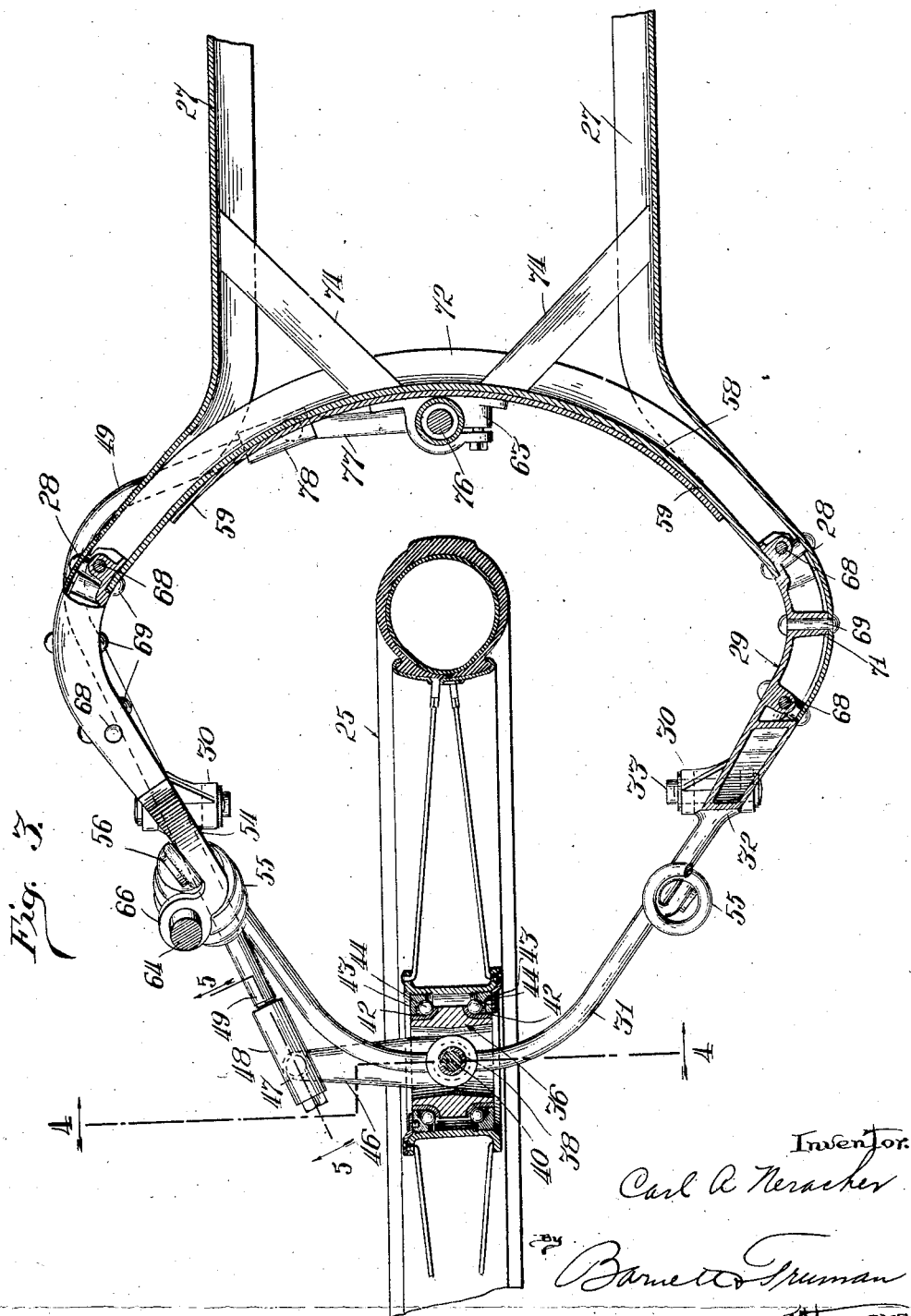

Feb. 24, 1925.
C. A. NERACHER
1,527,905
MOTOR CYCLE FRONT WHEEL ASSEMBLY
Original Filed June 27, 1921     4 Sheets-Sheet 3
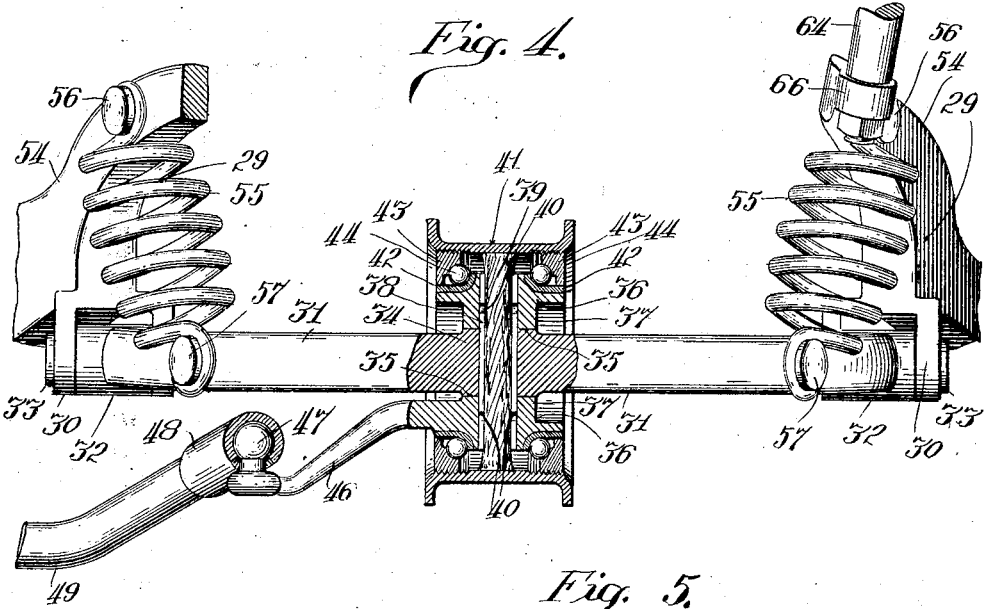
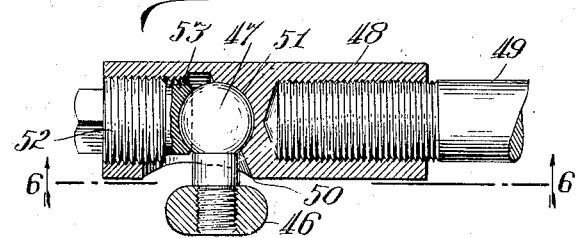
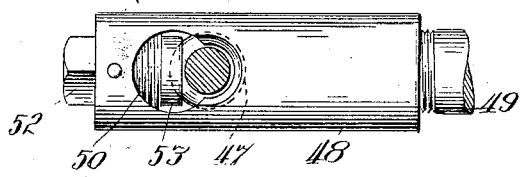
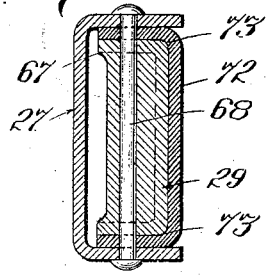
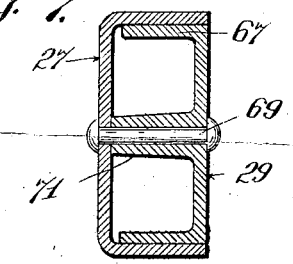
Inventor.
Carl A. Neracher
By Barnett Truman
Attorneys

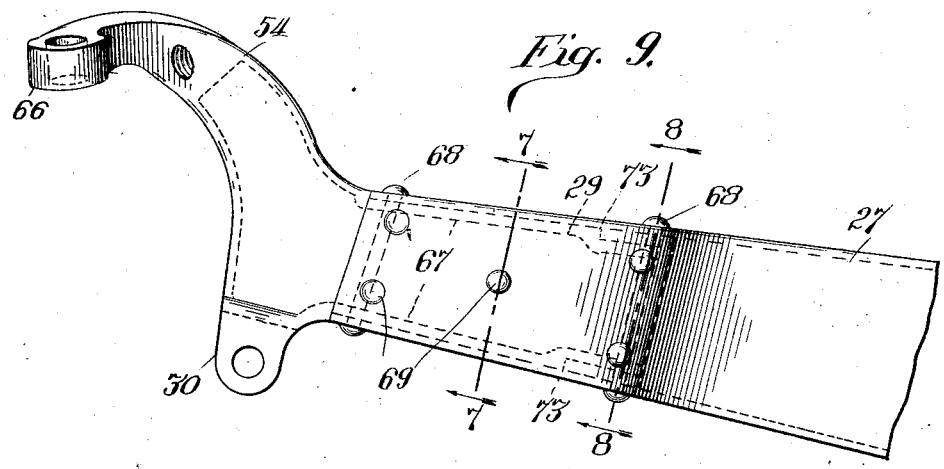
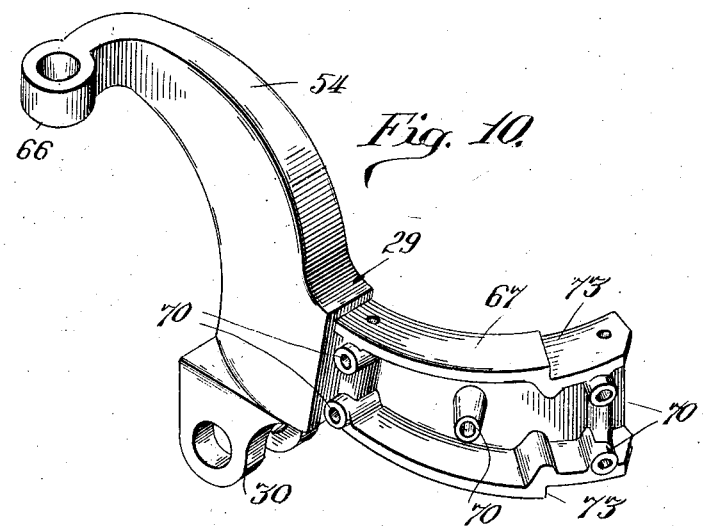
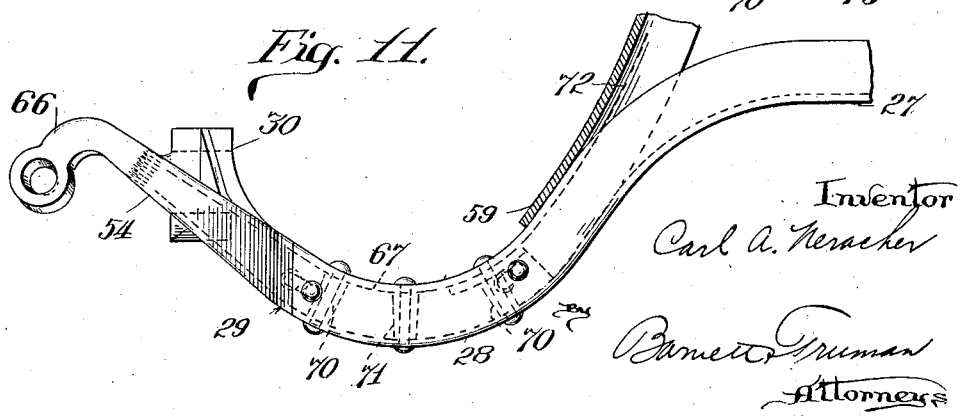

Patented Feb. 24, 1925.

1,527,905

UNITED STATES PATENT OFFICE.

CARL A. NERACHER, OF SYRACUSE, NEW YORK, ASSIGNOR TO NER-A-CAR CORPORATION, A CORPORATION OF NEW YORK.

MOTOR-CYCLE FRONT-WHEEL ASSEMBLY.

Original application filed June 27, 1921, Serial No. 480,770. Divided and this application filed March 15, 1923. Serial No. 625,250.

*To all whom it may concern:*

Be it known that I, CARL A. NERACHER, a citizen of the United States, residing at Syracuse, in the county of Onondaga and State of New York, have invented certain new and useful Improvements in Motor-Cycle Front-Wheel Assemblies, of which the following is a specification.

My invention relates to a motorcycle, and particularly to the front wheel assembly and steering mechanism for the front wheel.

One of the principal objects of the invention is to provide a novel and improved front wheel mounting which will resiliently support the frame on the front wheel so as to allow the wheel to yield upwardly and preferably backwardly when meeting an obstruction on the road, which will allow the wheel to be easily turned for steering in any position that it may assume, and which provides for steering on an axle inclined backwardly from the vertical in an upward direction so that the wheel will tend to remain aligned with the rear wheel of the motorcycle and will tend, when turned out of alignment therewith, in steering or when deflected by an obstruction, to return to such alignment.

A further object is to provide a steering mechanism for the front wheel consisting of a substantially upright steering post or column connected with the pivoted front wheel axle by a drag link which is substantially at the level of the frame or a trifle below the same. This construction eliminates entirely the usual front fork which is a source of weakness in the ordinary motorcycle. Besides this, the front wheel mounting of my invention is better adapted to the type of body which I prefer to use in which the main frame of the motorcycle is substantially horizontal and is located at approximately the level of the wheel centers and the front wheel covered by a mud guard which, instead of turning with the wheel as is usual, is fixed to the frame back of and over the front wheel and at the bottom is substantially as wide as the spread of the frame at the widest part of the latter. With a body of this sort a front wheel mounting employing an upright or substantially upright fork would involve difficulties of construction which are entirely avoided by the use of the front wheel mounting herein disclosed and the steering post and drag link mechanism for turning the wheel on its steering axis.

In the drawings,—

Fig. 1 is a view, in side elevation, with certain parts in section, of the front part of the motorcycle.

Fig. 2 is a fragmentary view, in side elevation, on a larger scale, illustrating in greater detail the front wheel mounting.

Fig. 3 is a sectional plan of the front portion of the motorcycle.

Fig. 4 is a sectional view on line 4—4 of Fig. 3.

Fig. 5 is a detail sectional view on line 5—5 of Fig. 3.

Fig. 6 is a sectional view on line 6—6 of Fig. 5.

Figs. 7 and 8 are cross sectional views on lines 7—7 and 8—8, respectively, of Fig. 9.

Fig. 9 is a fragmentary view, in side elevation, of the front end of one of the side frame members of the body and the casting for the front wheel carrier.

Fig. 10 is a view, in perspective, of the casting just referred to, and

Fig. 11 is a plan view, with parts in section, of one side of the front end of the frame.

Referring to the drawings, the numeral 25 designates the front or steering wheel of the motorcycle which may be of any desired construction. The wheel supports the front end of a frame structure which is preferably substantially horizontal and arranged approximately in line with the center of the front wheel. This structure comprises two side frame members 27 which are preferably channel-shaped in cross section, the frame members being arranged with their flanges projecting inwardly toward each other. The forward ends of the side frame members 27 are bowed out, as indicated at 28, to provide a space for the steering movements of the front or steering wheel 25, and each side frame has secured to its forward end, fitted into the channel thereof, a casting 29 (Fig. 10). These castings 29 are formed with forked portions 30 to provide pivotal connections for the front wheel carrier or suspension member 31, the latter consisting preferably of an integral bowed yoke formed at its extremities with bosses 32 which engage the forked portions 30 of the castings 29, the connections being completed by pintles 33. The yoke 31 is formed at its middle portion with a boss 34, the upper and lower flat surfaces 35 of which are inclined downwardly to a certain extent from front to rear. The wheel 25 revolves on a hollow axle member 36 formed with interior projections 37, 37 having flat inclined faces adapted to bear upon the upper and lower faces 35 of the boss 34. A pivot pin 38 extends through the axle member 36 and through the boss 34 of yoke 31 having a drive fit or other rigid connection with the yoke and a sufficiently loose fit with the axle to allow the latter to turn thereon. Preferably the pivot pin 38 is hollow and is provided with a wick 39 soaked in a lubricant. Perforations 40 are formed in the pivot pin to allow lubrication of the surfaces of the axle and pin in contact with each other.

The hub 41 of wheel 25 is mounted to revolve on axle 37 in any suitable manner. I have shown the axle as being provided with inner raceway members 42, 42, and outer raceway members 43, 43 are screwed into the hub. Antifriction balls 44 are arranged between said raceways. Members 43 are kept in place by clips 45. The axle is formed with a rigid steering arm 46 provided with a ball 47 adapted to fit into the ball casing 48 screwed upon the threaded end of drag link 49. The under side of casing 48 is formed with an opening 50 (Fig. 6) large enough to admit the ball 47 which is thereafter held in place against the socket cavity 51 of the casing 48 by means of a screw plug 52 having a curved face 53.

The castings 29 at the forward ends of the side frames 27 are formed with arms 54 projecting forwardly of the pivotal points of yoke 31 with the castings. Coiled springs 55 are interposed between the arms 54 and the yoke 31, being preferably connected to studs 56 on the castings and studs 57 on the yoke at points intermediate the pivotal points of the yoke and the middle or forward portion to which the wheel axle is pivoted. The springs 55 act as compression and tension springs to cushion the shock of the frame when the front wheel encounters an obstacle and to absorb the stress developed by the rebound. The pivot pin 38 on which the front wheel axle turns for steering is raked backwardly somewhat, as above stated, due to the upward inclination of the yoke and of the surfaces 35 on its boss 34, primarily so that the wheel will tend to remain in alignment with the rear wheel and, when turned from its normal alignment therewith, either in steering or by deflection in meeting an obstacle on the road, will tend to return automatically to such normal alignment thereby making the steering of the vehicle easy and convenient. As a matter of fact, with the front wheel mounting constructed as shown and with the frame and operating mechanism of the motorcycle at the low level indicated, it is possible to drive the motorcycle on an ordinarily smooth road without keeping the hands on the handle bar. This raking of the pivotal axis of the steering wheel also serves in conjunction with the pivoted resilient connection between the front wheel carrier and the frame and the upward inclination of the carrier in the forward direction, to ease the motorcycle over inequalities of the road.

In place of the usual front wheel mudguard that turns with the wheel and is necessarily rather narrow, the motorcycle of my invention is provided with a fixed mudguard 58 which spans the frame at its widest point and is, in effect, a species of dash board. The dash board mud guard is a pressed steel member. It is wide at the back and bottom and tapers upwardly and forwardly. The lower edges 59 are secured to the side frame members at the bowed out portions 28 of the same. This arrangement gives adequate protection to the driver against mud and dust thrown by the front wheel. Stay rods 64 are secured to the outer end of the mud guard and to lugs 66 on the arms 54 of castings 29. The portions 67 of the castings 29 which fit into the forward ends of the channeled side frames 27 are of box-like configuration (Figs. 7 and 10), the casting being secured to the side frame member, in each case, by rivets 68 passing through the parts from top to bottom and horizontal rivets 69 which extend through bosses 71 formed on the portion 67 of the casting.

The side frame members 27 are connected with each other by means of a channel-shaped, backwardly curved transverse member 72, arranged with its open side toward the back of the machine and with its forward ends aligned and engaged with the outwardly curved portions 28 of the side frame members. The forward ends of the transverse member 72 overlap the rear ends of castings 29 which are reduced in width and height for this purpose, as shown at 73. The rivets 68, 69 at the rear end of the casting serve also to secure the transverse member 72 to the side frames. The construction is further strengthened by diagonal struts 74 extending from the middle portion of member 72 to the side frame members.

The motorcycle is preferably provided with two head lights 75, 75, arranged on opposite sides of the front mud guard and secured thereto. This arrangement of the head lights forms no part of the invention herein claimed.

The steering post 76 is provided with a laterally projecting arm 77 with which the drag link 49 is articulated by any suitable flexible joint 78, such as that shown in Figs. 5 and 6 and previously described. The steering post turns in a tubular casing 79 which is stepped in a clamping casting 63 secured to the transverse frame member 72. The upper portion of the casing 79 is fastened to the front mud guard by a strut 81. A soft rubber bushing 84 is interposed between the casing and the mud guard (Fig. 1) the opening in which is larger than the casing to prevent injury to the mud guard through vibration of the casing. The steering post 76 is provided with a handle bar 85 having hand grips (not shown). The drag link 49 having threaded connections with joints 48 and 78, it is a simple matter to make an adjustment of the steering gear to bring the handle bar in proper angular relationship with the front wheel. 93 designates the housing for the operating mechanisms of the motor cycle which span the side frame members back of the front mud guard. The invention herein claimed is not concerned with this part of the structure.

This application is a division of my co-pending application Serial No. 480,770 filed June 27, 1921, and is a continuation in part of my co-pending applications Serial No. 290,979 filed April 18, 1919 and Serial No. 332,244, filed October 21, 1919. I have shown herein a fixed front mud guard, but this is not claimed in this application, being part of the subject-matter of application Serial No. 480,770 and claimed therein.

I claim:

1. A motorcycle comprising, in combination, a wheel, a substantially horizontal frame at approximately the level of the wheel center, a front wheel carrier resiliently connected with the frame, a rigid front wheel axle pivoted to the carrier for steering movements of the wheel, steering mechanism comprising a link directly connected with said axle, and a substantially upright steering post to which the link is connected.

2. A motorcycle comprising, in combination, a front wheel, a substantially horizontal frame at approximately the level of the wheel center, a rigid front wheel carrier pivoted to and resiliently connected with the frame, a front wheel axle pivoted to the carrier on an axis raked backwardly from the vertical, and steering mechanism comprising a link connected with said axle.

3. A motorcycle comprising, in combination, a front wheel, a substantially horizontal frame at approximately the level of the wheel center, a rigid front wheel carrier pivoted to the frame and connected therewith by coiled springs, a front wheel axle pivoted to the carrier for steering movements of the wheel, and steering mechanism comprising a drag link connected with said axle.

4. A motorcycle comprising, in combination, a front wheel, a substantially horizontal frame at approximately the level of the wheel center, a front wheel carrier pivoted to said frame, a front wheel axle pivoted to the carrier for steering movements of the wheel, and springs connecting the frame with the carrier at points intermediate the pivotal points of the latter on the frame and the connection thereto of the front wheel axle.

5. A motorcycle comprising, in combination, a front wheel, a substantially horizontal frame at approximately the level of the wheel center, a front wheel carrier pivoted to said frame, a front wheel axle pivoted to the carrier for steering movements of the wheel, and tension and compression springs connecting the frame with the carrier at points intermediate the pivotal points of the latter on the frame and the connection thereto of the front wheel axle.

6. A motorcycle comprising, in combination, a wheel, a substantially horizontal frame at approximately the level of the wheel center, a front wheel carrier pivoted to said frame, a front wheel axle pivoted to the carrier for steering movements of the wheel, springs connecting the frame with the carrier at points intermediate the pivotal points of the latter on the frame and the connection thereto of the front wheel axle, and a steering mechanism comprising a drag link connected to said axle.

7. A motorcycle comprising, in combination, a front wheel, a substantially horizontal frame at approximately the level of the wheel center, a front wheel carrier pivoted to said frame, a front wheel axle pivoted to the carrier for steering movements of the wheel, springs connecting the frame with the carrier at points intermediate the pivotal points of the latter on the frame and the connection thereto of the front wheel axle, a steering mechanism comprising a drag link connected to said axle, and a substantially upright steering post to the lower end of which the drag link is connected.

8. A motorcycle comprising, in combination, a front wheel, a substantially horizontal frame at approximately the level of the wheel center, a rigid front wheel carrier pivoted to said frame, a front wheel axle pivoted to the carrier for steering movements of the wheel, springs connecting the frame with the carrier, an outwardly projecting arm on said axle, and steering mechanism comprising a link articulated with said arm.

9. A motorcycle comprising, in combination, a front wheel, a substantially horizontal frame at approximately the level of the wheel center, a rigid front wheel carrier pivoted to said frame, a front wheel axle pivoted to the carrier for steering movements of the wheel, springs connecting the frame with the carrier, an outwardly projecting arm on said axle, steering mechanism comprising a link articulated with said arm, and a substantially upright steering post with which the other end of the link is connected.

10. A motorcycle comprising, in combination, a front wheel, a substantially horizontal frame at approximately the level of the wheel center, an integral yoke the ends of which are pivoted to the front end of the frame, a hollow front wheel axle through which said yoke extends, a pivot raked backwardly for connecting the axle with the yoke, springs interposed between the frame and the yoke, an arm on said axle, a substantially upright steering post having an arm at its lower end, and a link articulated with said arm.

11. In a motorcycle, the combination of a front steering wheel, a frame at approximately the level of the wheel center, a rigid carrier for the wheel, substantially aligned with and pivoted and resiliently connected at its ends to the frame which provides the only means of support of the frame on said wheel, and means for mounting the wheel on said carrier to have steering movements on an axis slightly raked backwardly from the vertical.

12. In a motorcycle, the combination of a front steering wheel, a frame at approximately the level of the wheel center, an integral yoke pivotally and resiliently connected at its ends with the forward end of the frame on which at its middle point said wheel is mounted for steering movements, an axle for said wheel pivoted to said carrier on an axis slightly raked back from the vertical, and steering mechanism comprising a link connected with said axle.

13. In a motorcycle, the combination of a front wheel, a frame comprising frame members on opposite sides of said wheel, a wheel carrier pivoted to the frame members on the forward portion of which the wheel is mounted for steering movements, and springs interposed between the extremities of the frame members and the middle portions of the carrier.

14. In a motorcycle, the combination of a front wheel, a frame comprising frame members on opposite sides of said wheel, a wheel carrier pivoted to the frame members on the forward portion of which the wheel is mounted for steering movements, and tension and compression springs interposed between the extremities of the frame members and the middle portions of the carrier.

15. In a motorcycle, the combination of a front wheel, a frame comprising frame members on opposite sides of said wheel, a wheel carrier pivoted to the frame members on the forward portion of which the wheel is mounted for steering movements a steering link which constitutes the only connection between the forward portion of the wheel carrier and the motor cycle frame, and tension and compression springs interposed between the frame members and the carrier.

16. In a motorcycle, the combination of a front wheel, a frame comprising channel-shaped side members, castings fitted into the forward ends of said members, each of which castings has an upper and a lower arm, a yoke pivoted to said lower arms, a wheel axle pivoted to the forward part of the yoke, and springs connected to said upper arm and to the middle portions of the yoke.

17. In a motorcycle, the combination of side frame members, a front wheel, a hollow axle therefor, a rigid yoke pivoted to and resiliently connected with said side frame members, extending through said axle and formed with upper and lower bearing surfaces, inclined upwardly in a forward direction, said axle being formed interiorly with corresponding surfaces, and a pivot pin extending through said bearing surfaces to pivot the axle to the yoke.

18. In a motorcycle, the combination of side frame members, a front wheel, a hollow axle therefor, a rigid yoke pivoted to and resiliently connected with said side frame members, extending through said axle and formed with upper and lower bearing surfaces inclined upwardly in a forward direction, said axle being formed interiorly with corresponding surfaces, a pivot pin extending through said bearing surfaces to pivot the axle to the yoke, an arm on said axle, and steering mechanism comprising a link connected to said arm.

19. In a motorcycle, the combination of side frame members, a front wheel, a hollow axle therefor, a yoke pivoted to said side frame members extending through said axle and formed with upper and lower bearing surfaces inclined upwardly in a forward direction, said axle being formed interiorly with corresponding surfaces, a pivot pin extending through said bearing surfaces to pivot the axle to the yoke, and springs interposed between said frame members and points on the yoke back of the axle connection therewith.

20. In a motorcycle, the combination of side frame members, a front wheel, a hollow axle therefor, a yoke pivoted to said side frame members extending through said axle and formed with upper and lower bearing surfaces inclined upwardly in a forward direction, said axle being formed interiorly with corresponding surfaces, a pivot pin extending through said bearing surfaces to pivot the axle to the yoke, said frame members being provided with projections above and beyond the pivot points of the yoke, and springs interposed between said projections and the yoke.

21. In a motorcycle, the combination of side frame members, a front wheel, a hollow axle therefor, a yoke pivoted to said side frame members extending through said axle and formed with upper and lower bearing surfaces inclined upwardly in a forward direction, said axle being formed interiorly with corresponding surfaces, a pivot pin extending through said bearing surfaces to pivot the axle to the yoke, said frame members being provided with projections above and beyond the pivot points of the yoke, and springs interposed between said projections and the yoke.

22. In a motorcycle, the combination of side frame members, a front wheel, a hollow axle therefor, a yoke pivoted to and resiliently connected with said side frame members, extending through said axle and formed with upper and lower bearing surfaces, inclined upwardly in a forward direction, said axle being formed interiorly with corresponding surfaces, and a pivot pin extending through said bearing surfaces to pivot the axle to the yoke, said pivot pin being hollow and perforated for a lubricant.

23. In a motorcycle, the combination of a frame, a rigid yoke pivoted to the frame and without other connections therewith, a front wheel having an axle pivoted to the yoke for steering, a steering post revolubly mounted in the frame, and a link connecting the lower end of the post with said wheel axle.

24. A motorcycle comprising, in combination, a front wheel, a frame, means for resiliently supporting the frame on the front wheel comprising a rigid yoke-like structure on the middle portion of which the wheel is mounted to turn on an axis slightly raked backwardly from the vertical, the ends of said structure being pivoted to the frame and without other connections therewith preventing free angular movement thereof, and springs interposed between said structure and the frame whereby the front wheel has cushioning movements with respect to the frame on an arc.

25. A motorcycle chassis comprising, in combination, a front wheel, a frame, and means for supporting the frame on the front wheel which permits the wheel to rotate, turn on an axis slightly raked from the vertical, and to have cushioning oscillations on an arc.

26. In combination with the frame and front steering wheel of a motorcycle, a pivoted axle on which said front wheel revolves, an arm on said axle, a steering post having an arm and provided with handle bars, and a link connecting said arms, the length of which is adjustable, for the purpose described.

27. In a motorcycle, the combination of a body, a front wheel, a steering post, means for supporting said body on the front wheel comprising a rigid yoke and a front wheel axle pivoted to the forward part of the yoke on a backwardly raked axis, a drag link connecting said axle and steering post, pivots connecting the yoke with the body, and cushioning springs between said yoke and body; said drag link, spring and pivots forming the only connections between the yoke and body.

28. In a motorcycle, the combination of a frame, a front wheel and means for supporting the frame on the front wheel comprising a rigid yoke which is pivoted to and projects forwardly from the front end of the frame, an axle for the front wheel pivoted to the forward end of the yoke on a backwardly raked axis, and springs interposed between said yoke and frame.

29. In a motorcycle, the combination of a frame, a front wheel and means for supporting the frame on the front wheel comprising a rigid yoke which is pivoted to and projects forwardly and upwardly from the front end of the frame, an axle for the front wheel pivoted to the forward end of the yoke on a backwardly raked axis, and springs interposed between said yoke and frame.

30. In a motorcycle, the combination of a frame, a front wheel, means for supporting the frame on the front wheel comprising a rigid yoke which is pivoted to and projects forwardly from the front end of the frame, an axle for the front wheel pivoted to the forward end of the yoke on a backwardly raked axis, springs interposed between said yoke and frame, a steering post provided with a laterally projecting arm, and an arm on said front wheel axle and a drag link articulated with said arms.

31. In a motorcycle, the combination of a front wheel, a frame having a pair of substantially horizontal members extending on opposite sides of said front wheel, a structure arranged at substantially the level of the frame which forms the sole means of supporting the frame on the front wheel and consists of an integral rigid yoke resiliently and pivotally connected with the frame members to oscillate thereon as a unit, and means for mounting the front wheel on the forward end of said yoke on an axis for steering slightly inclined backwardly from the vertical.

32. In combination with a motorcycle, front wheel and a frame having forwardly projecting members on opposite sides of the wheel; a rigid yoke pivotally and resiliently mounted on said frame members and formed with a centrally disposed boss, a hollow axle member through which the yoke extends provided with bearings for said wheel and formed with inwardly projecting lugs adapted to bear on the upper and lower surfaces of said boss, and a pivot pin for connecting said axle member and yoke.

33. Means for mounting the front wheel of a motorcycle to the frame thereof, comprising, in combination, a hollow axle member formed with inwardly projecting lugs, bearings interposed between said member and the hub of the wheel, an integral yoke extending through said axle member and formed with a boss interposed between said lugs and bearing on the same at top and bottom, and a pivot pin extending through the boss and lugs in a direction slightly inclined from the vertical.

34. In a motorcycle, the combination of a front wheel, a frame having a pair of substantially horizontal members extending on opposite sides of said front wheel, a structure arranged at substantially the level of the frame which forms the sole means of supporting the frame on the front wheel and consists of an integral, rigid yoke resiliently and pivotally connected with the frame members to oscillate thereon as a unit and projecting forwardly beyond the end of said members, and means for mounting the front wheel on the forward end of said yoke on an axis for steering slightly inclined backwardly from the vertical.

CARL A. NERACHER.